Oct. 31, 1950     B. LILIEN     2,528,234

PATTY MOLDING MACHINE

Filed April 8, 1948     2 Sheets-Sheet 1

Benjamin Lilien
INVENTOR.

BY Clarence A. O'Brien
and Harvey B. Jackson
Attorneys

Oct. 31, 1950  B. LILIEN  2,528,234
PATTY MOLDING MACHINE
Filed April 8, 1948  2 Sheets-Sheet 2

Benjamin Lilien
INVENTOR.

Patented Oct. 31, 1950

2,528,234

UNITED STATES PATENT OFFICE 2,528,234

PATTY MOLDING MACHINE

Benjamin Lilien, Los Angeles, Calif.

Application April 8, 1948, Serial No. 19,839

2 Claims. (Cl. 17—32)

The present invention relates to new and useful improvements in patty molding machines for molding ground meat or other food patties of a uniform size and shape ready for use in cooking on a grill, or to be packed for future use.

An important object of the invention is to provide a patty molding machine embodying a rotating drum having a transversely extending cylinder with a double piston freely working therein to mold the patties and providing means for adjusting the stroke of the pistons to regulate the weight or thickness of the patties.

A further object of the invention is to provide a device of this character wherein the patties are rapidly and constantly molded without requiring handling of the food.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
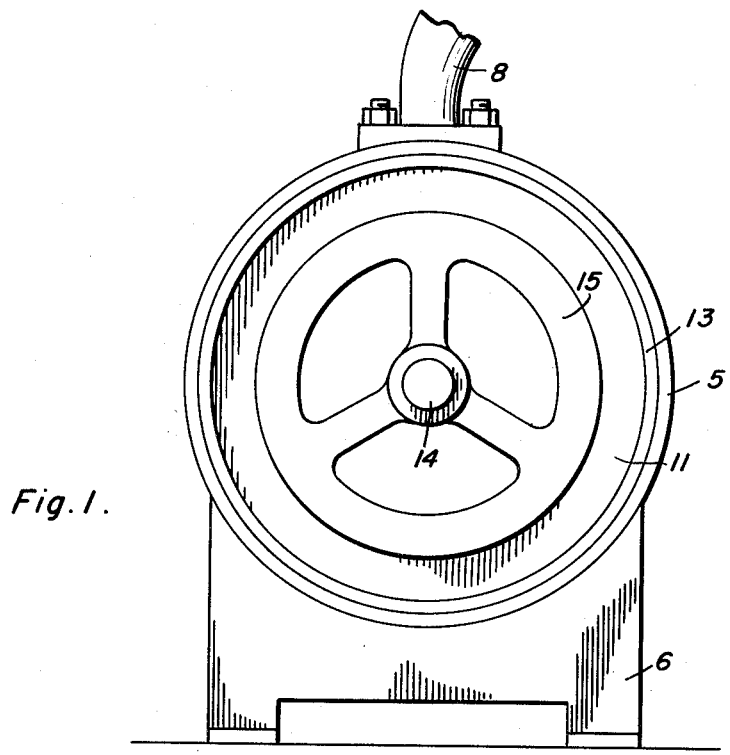
Figure 1 is a side elevational view.
Figure 4:
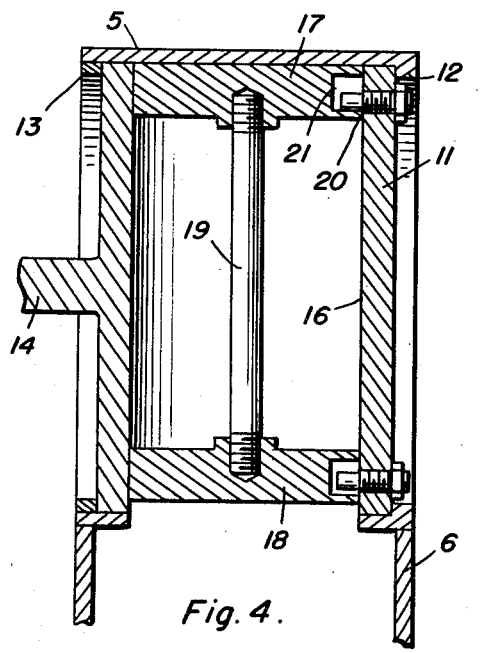
Figure 4 is a transverse sectional view taken substantially on a line 4—4 of Figure 3.
Figure 5:
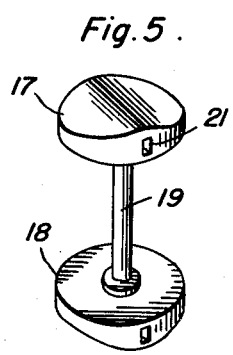
Figure 5 is a perspective view of the double piston on a reduced scale.

Referring now to the drawings in detail wherein for the purpose of illustration I have disclosed a preferred embodiment of the invention the numeral 5 designates a casing ring supported in an upright position on legs 6 and provided with a ground food receiving opening 7 in its upper portion to which a filler nozzle 8 is suitably attached. The lower portion of the casing ring is provided with a discharge opening 9 having a bevelled scraping edge 10.

A drum 11 is rotatably mounted in the casing ring 5, one side of the drum being held against an inwardly projecting flange 12 at one edge of the casing ring and the other side of the drum being engaged by a retainer ring 13 positioned in the opposite edge of the casing ring to hold the drum 11 in position in the casing.

A shaft 14 extends outwardly from the center of the drum at one side thereof and to which a pulley 15 is secured to be driven by a suitable source of power for rotating the drum.

A cylindrical chamber 16 is formed transversely in the drum 11 and in which a pair of pistons 17 and 18 are positioned for working therein, the pistons being connected to each other by a rod 19 threaded at its ends into the inner surfaces of the pistons for adjustment relative to each other. The outer surfaces of the pistons are rounded to conform to the internal curvature of the casing ring 5.

The pistons 17 and 18 work freely in the cylinder 16 and are restricted in their movements by stop pins 20 threaded into one side of the drum 11 and with the inner ends of the stops projecting into slots 21 in the periphery of the pistons, the slots being of a length to permit limited reciprocating movement of the pistons in the cylinder 16.

Figure 3:
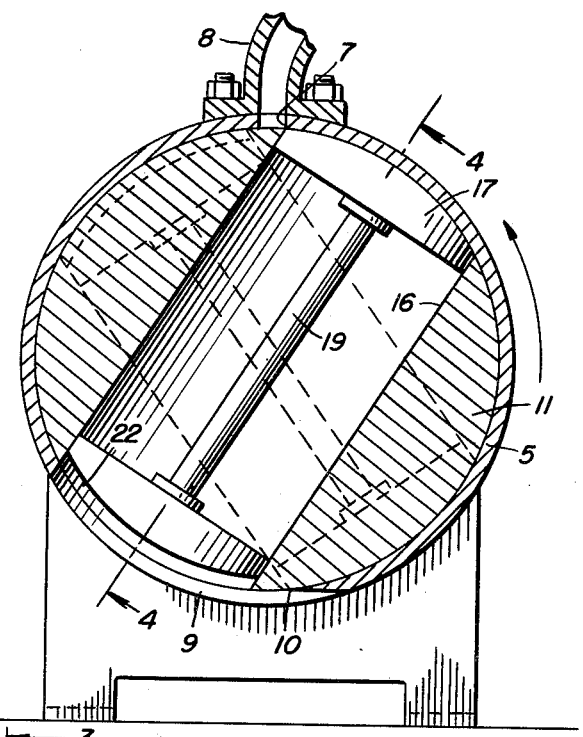
Figure 3 is a vertical sectional view taken substantially on a line 3—3 of Figure 2.
Figure 2:
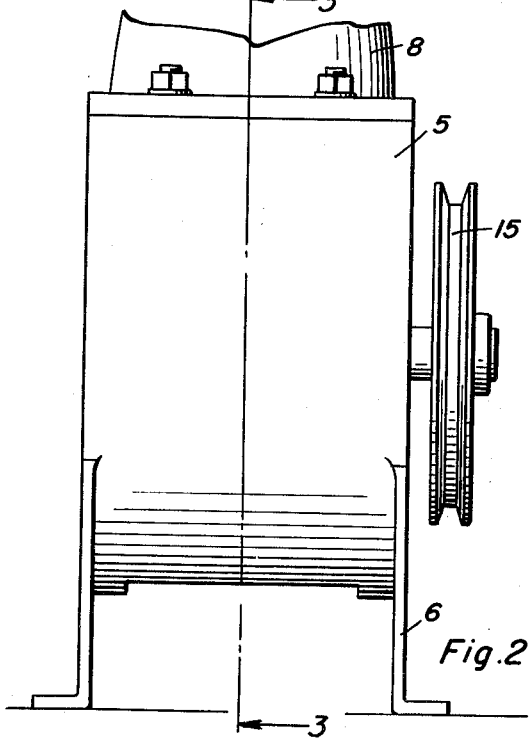
Figure 2 is an end elevational view.
Figure 6:
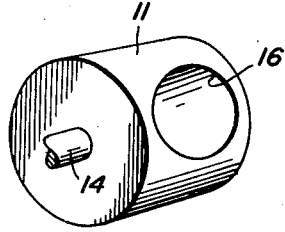
Figure 6 is a similar view on a reduced scale of the rotating drum.

In the operation of the device the drum 11 is rotated in any suitable manner to cause one end of cylinder 16 to pass under the filler opening 7 while the other end of the cylinder is passing over the discharge opening 9, the drum being rotated in a direction as shown by the arrow in Figure 3 of the drawings.

Ground meat or other food is forced through nozzle 8 by means of a meat grinder or the like and the pistons 17 and 18 are adjusted relative to each other to permit a limited inward movement of one of the pistons by pressure of the food as the piston passes under the filler opening 7 whereby to form a mold 22 in the end of the cylinder.

The ground food from nozzle 8 fills the mold 22 as the piston passes across the filling opening 7 and is carried around casing ring 5 with the drum until it reaches discharge opening 9 and at which time the opposite piston is passing under the filling opening whereupon pressure of food from the nozzle will force the adjacent piston inwardly and force the piston adjacent opening 9 outwardly to eject the molded patty from the mold.

The scraper 10 on the far edge of discharge opening 9 with respect to the direction of travel of the drum will scrape the patty from the outer surface of the piston and keep the pistons clean.

The stops 20 working in slots 21 of the pistons limit the stroke thereof and the adjustment of the pistons on the ends of rod 19 increases or decreases the depth of mold chamber 22 to regulate the weight or thickness of the patties formed therein.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A patty molding machine comprising a stationary casing having a filling opening and a discharge opening, a drum rotatable in the casing and having a transverse cylinder registering at one end with the filling opening while its opposite end registers with the discharge opening to receive material from the filling opening and to discharge the same from the discharge opening, and a free piston working in the cylinder and actuated by pressure of material entering one end of the cylinder to eject a previously formed patty from the opposite end of the cylinder, said piston being composed of a pair of heads, a rod threadedly connected at each end to the heads to adjust the heads relative to each other for regulating the thickness of the patty formed in the cylinder, and stop means limiting reciprocating movement of the piston in opposite directions and also locking the heads in adjusted positions.

2. A patty molding machine comprising a stationary casing having a filling opening and a discharge opening, a drum rotatable in the casing and having a transverse cylinder registering at one end with the filling opening while its opposite end registers with the discharge opening to receive material from the filling opening and to discharge the same from the discharge opening, a free piston working in the cylinder and actuated by pressure of material entering one end of the cylinder to eject a previously formed patty from the opposite end of the cylinder, said piston comprising a pair of heads and a connector rigidly securing the heads to each other in relative adjusted position by a turning movement of the heads relative to the connector, said heads having a longitudinal slot, and stop pins carried by the drum and engaged in said slots to limit reciprocating movement of the piston and also locking the heads from turning.

BENJAMIN LILIEN.

REFERENCES CITED

The following references are of record in the file of this patent:

UNITED STATES PATENTS

| Number | Name | Date |
|---|---|---|
| 615,421 | Beyer et al. | Dec. 6, 1898 |
| 1,408,310 | Singh | Feb. 28, 1922 |
| 1,473,590 | Wallace | Nov. 6, 1923 |
| 1,872,103 | Bergmann | Aug. 16, 1932 |

FOREIGN PATENTS

| Number | Country | Date |
|---|---|---|
| 13,027 | Austria | Aug. 25, 1903 |